(12) United States Patent
Chiang

(10) Patent No.: US 6,260,750 B1
(45) Date of Patent: Jul. 17, 2001

(54) SUIT HANGER FOR USE IN A CAR

(76) Inventor: Chin-Fu Chiang, No. 182, Sec. 1, Chin-Hwa Rd., Tainan City (TW)

( * ) Notice: Subject to any disclaimer, the term of this patent is extended or adjusted under 35 U.S.C. 154(b) by 0 days.

(21) Appl. No.: 09/596,778

(22) Filed: Jun. 19, 2000

(51) Int. Cl.⁷ ....................................................... B60R 7/04
(52) U.S. Cl. ............................................................ 224/275
(58) Field of Search ..................................... 224/313, 275

(56) References Cited

U.S. PATENT DOCUMENTS

| 4,957,230 | * | 9/1990 | Gonzales | 224/275 |
| 5,058,790 | * | 10/1991 | LaVelle | 224/275 |
| 5,383,588 | * | 1/1995 | Kazel | 224/275 |

FOREIGN PATENT DOCUMENTS

WO 93/25411 A1 * 12/1993 (WO) .................................. 224/275

* cited by examiner

*Primary Examiner*—Stephen P. Garbe
(74) *Attorney, Agent, or Firm*—Ladas & Parry

(57) ABSTRACT

A suit hanger is adapted for use in an interior of a car which is provided with a seat member and a headrest member that has a pair of downwardly extending vertical mounting rods for mounting on top of the seat member. The suit hanger includes a main body and a pair of connecting members. The main body has an upwardly curving upper bar with two opposite ends, a pair of lower bars disposed below the upper bar, and a pair of vertical bars. Each of the lower bars has an outer end connected to a respective one of the opposite ends of the upper bar, and an inner end that extends from the outer end in a direction toward the other one of the lower bars. Each of the vertical bars has an upper end portion connected to the inner end of a respective one of the lower bars, and a lower end portion. Each of the connecting members has a first mounting tube that is sleeved on the lower end portion of a respective one of the vertical bars, a second mounting tube adapted to be sleeved on a respective one of the mounting rods of the headrest member, and a connecting portion interconnecting the first and second mounting tubes.

14 Claims, 5 Drawing Sheets

SUIT HANGER FOR USE IN A CAR

BACKGROUND OF THE INVENTION

1. Field of the Invention

This invention relates to a suit hanger, more particularly to a suit hanger adapted for use in an interior of a car.

2. Description of the Related Art

Conventionally, the interior of a car is not equipped with a suit hanger. When it is desired to hang a suit in the interior of a car, a conventional suit hanger is commonly used. However, the conventional suit hanger may easily drop and is therefore not suitable for hanging clothes in the interior of a car.

SUMMARY OF THE INVENTION

Therefore, the object of the present invention is to provide a suit hanger adapted for use in the interior of a car.

Accordingly, the suit hanger of the present invention is adapted for use in an interior of a car which is provided with a seat member and a headrest member that has a pair of downwardly extending vertical mounting rods for mounting on top of the seat member. The suit hanger includes a main body and a pair of connecting members. The main body has an upwardly curving upper bar with two opposite ends, a pair of lower bars disposed below the upper bar, and a pair of vertical bars. Each of the lower bars has an outer end connected to a respective one of the opposite ends of the upper bar, and an inner end that extends from the outer end in a direction toward the other one of the lower bar. Each of the vertical bars has an upper end portion connected to the inner end of a respective one of the lower bars, and a lower end portion. Each of the connecting members has a first mounting tube that is sleeved on the lower end portion of a respective one of the vertical bars, a second mounting tube adapted to be sleeved on a respective one of the mounting rods of the headrest member, and a connecting portion interconnecting the first and second mounting tubes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
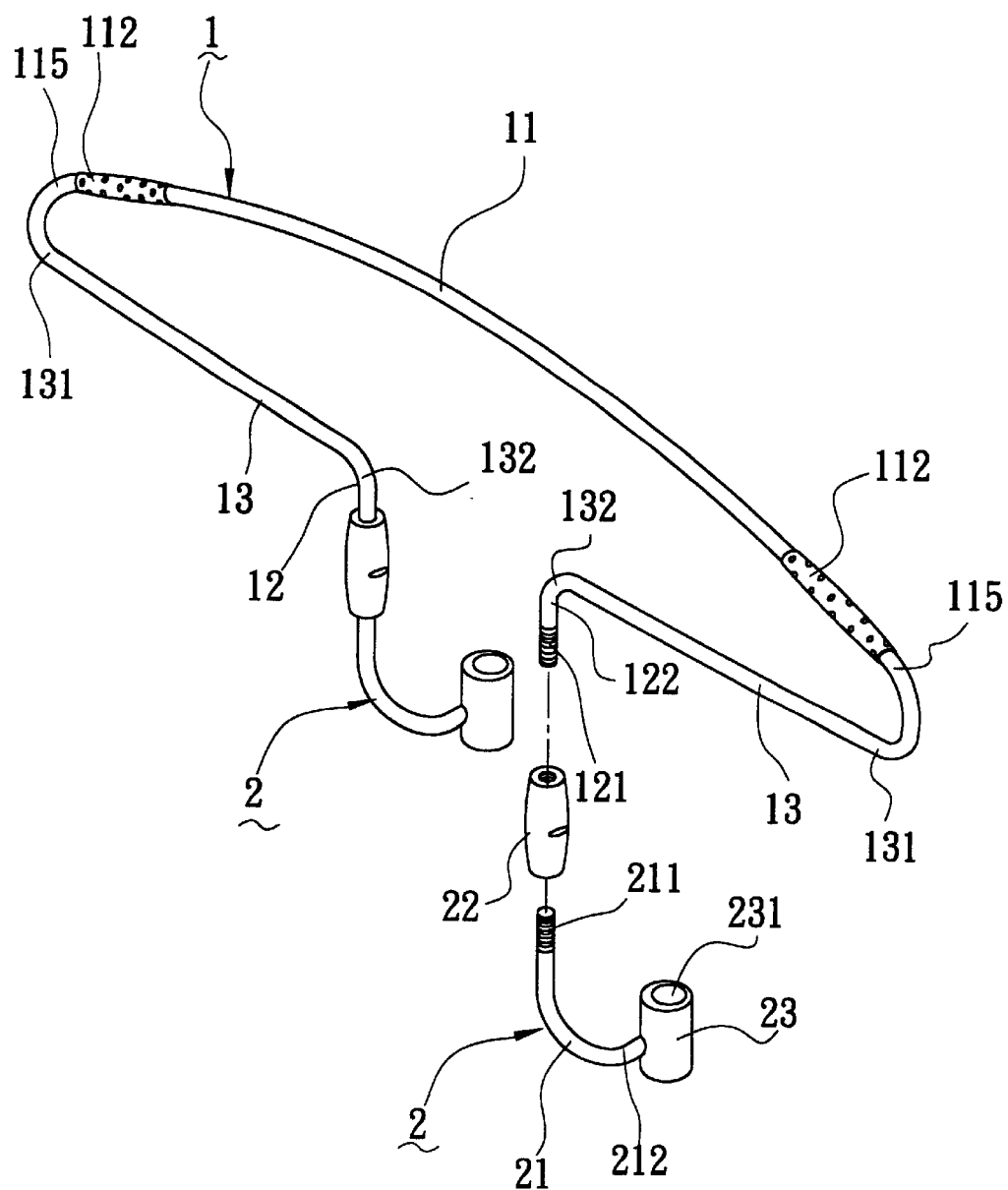
FIG. 1 is an exploded perspective view of a first preferred embodiment of the suit hanger of the present invention.
Figure 2:
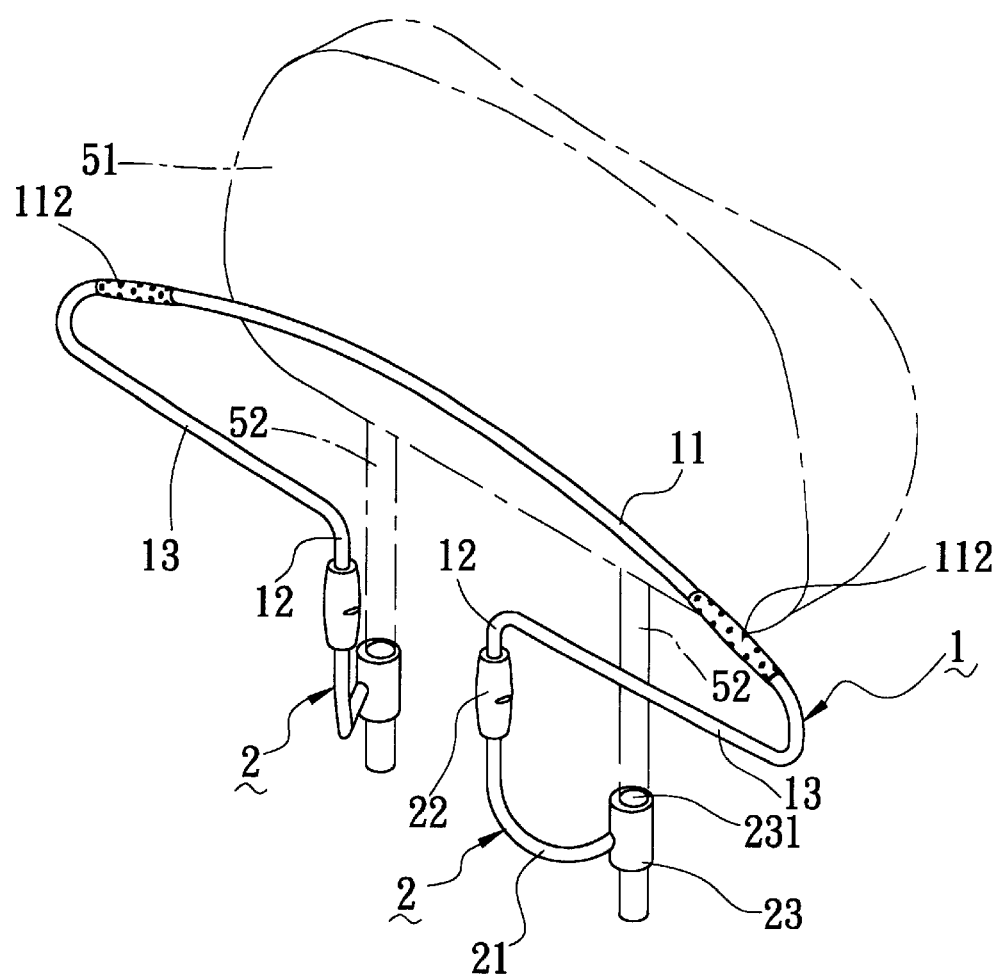
FIG. 2 is a perspective view of the first preferred embodiment when installed on a headrest member in the interior of a car.

Referring to FIGS. 1 and 2, the first preferred embodiment of the suit hanger of the present invention is adapted to be used in an interior of a car which is equipped with a seat member (not shown) and a headrest member 51 that has a pair of downwardly extending vertical mounting rods 52 for mounting on top of the seat member. The suit hanger of the first preferred embodiment is shown to include a main body 1 and a pair of connecting members 2.

The main body 1 is formed by bending an elongate rod, and includes an upwardly curving upper bar 11 with two opposite ends 115, a pair of horizontal lower bars 13 disposed below the upper bar 11, and a pair of vertical bars 12 extending downwardly from the lower bars 13. Each of the lower bars 13 has an outer end 131 connected integrally to a respective one of the opposite ends 115 of the upper bar 11, and extends from the outer end 131 in a horizontal direction toward the other one of the lower bars 13 to form an inner end 132. Each of the vertical bars 12 has an upper end portion 122 connected integrally to the inner end 132 of a respective one of the lower bars 13, and a lower end portion 121 formed with an external screw thread. A pair of resilient anti-slip members 112 are sleeved on the upper bar 11 adjacent to the opposite ends 115.

Each of the connecting members 2 includes a first mounting tube 22, a second mounting tube 23, and a connecting portion 21. The first mounting tube 22 has an open upper end for receiving the lower end portion 121 of a respective one of the vertical bars 12, and is formed with an internal screw thread for engaging the external screw thread on the lower end portion 121 of the respective one of the vertical bars 12. The second mounting tube 23 confines an axial passage hole 231, and is adapted to be sleeved on a respective one of the vertical mounting rods 52 of the headrest member 51. The connecting portion 21 is formed as a curved rod, and has a vertically extending upper first end portion 211 that is formed with an external screw thread and that extends into the first mounting tube 22 via an open lower end of the latter for engaging threadedly the first mounting tube 22, and a horizontally extending lower second end portion 212 that is connected securely to an outer wall surface of the second mounting tube 23.

The first end portion 211 of the connecting portion 121 is rotatable relative to the first mounting tube 22 after the connecting portion 21 is assembled to the first mounting tube 22 so as to permit adjustment of the distance between the second mounting tubes 23 of the connecting members 2 for conforming with the distance between the mounting rods 52 of the headrest member 51 to which the suit hanger of the present embodiment is applied. During installation, the headrest member 51 is detached from the seat member (not shown) at first. The suit hanger of the present embodiment is disposed behind the headrest member 51. The mounting rods 52 are extended respectively through the axial passage holes 231 in the second mounting tubes 23, and are then inserted into insert holes (not shown) in the seat member to complete the installation. When the suit hanger of the present embodiment is not in use, the main body 1 may be detached from the connecting members 2, which may then be turned toward the headrest member 51.

Figure 3:
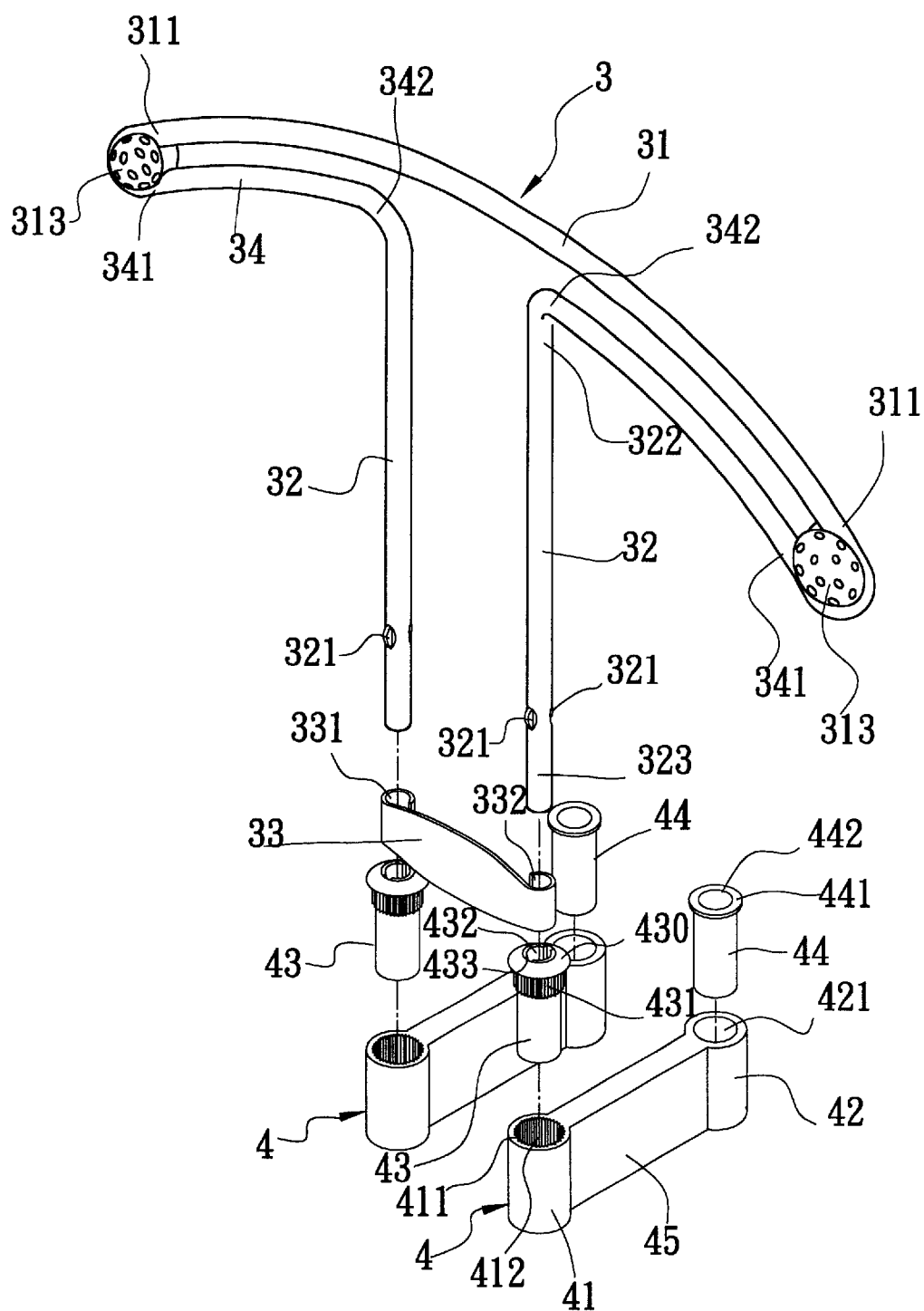
FIG. 3 is an exploded perspective view of a second preferred embodiment of the suit hanger of the present invention.
Figure 4:
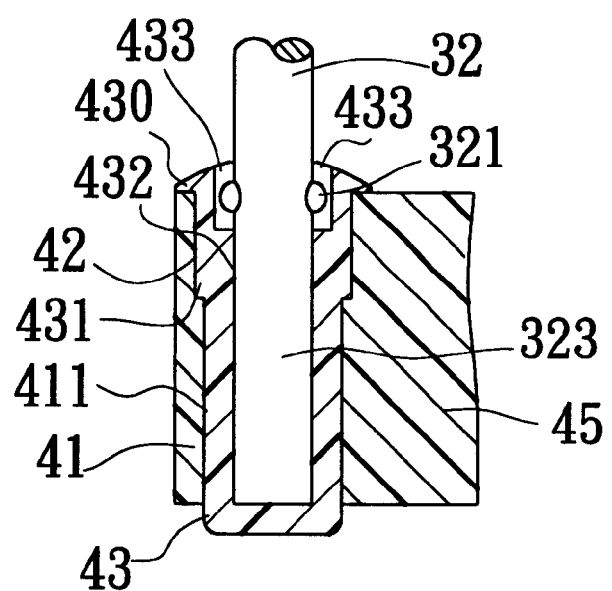
FIG. 4 is a fragmentary sectional view illustrating the connection between a connecting member and a main body of the suit hanger of the second preferred embodiment.
Figure 5:
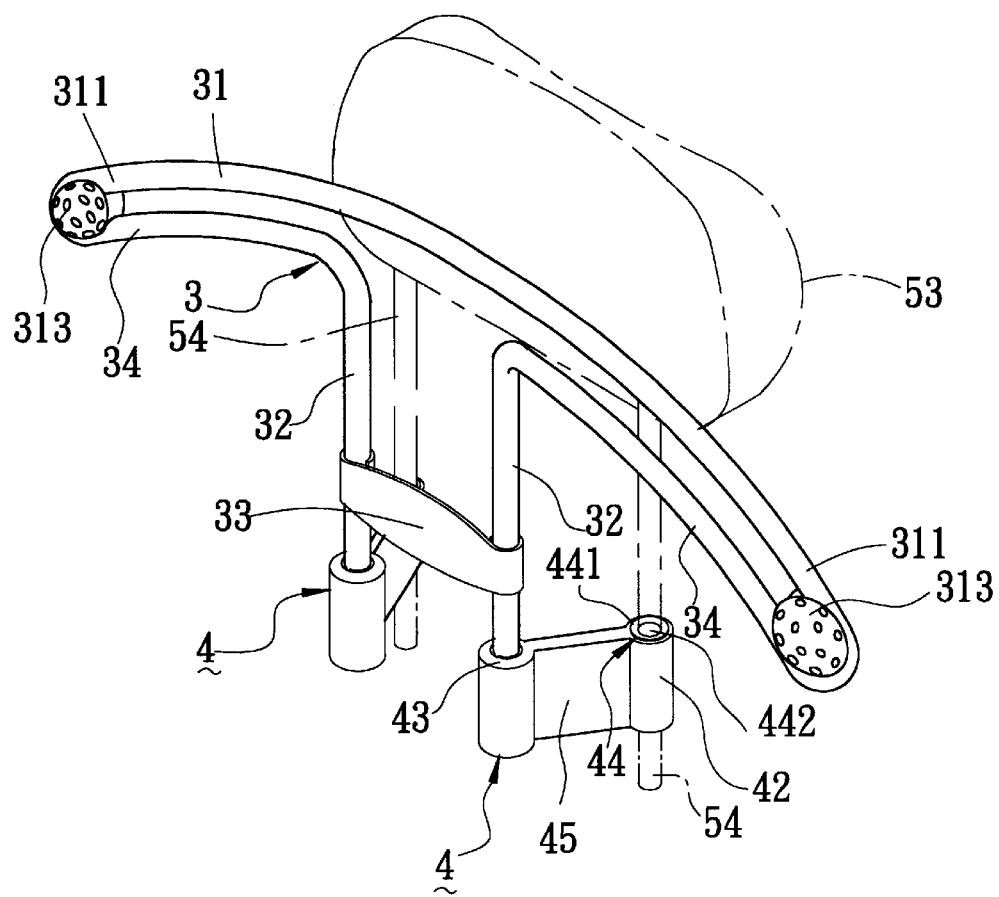
FIG. 5 is a perspective view of the second preferred embodiment when installed on a headrest member in the interior of a car.

Referring to FIGS. 3 to 5, the second preferred embodiment of the suit hanger of the present invention is shown to include a main body 3, a pair of connecting members 4, a pair of packing sleeves 44, and a pair of coupling sleeves 43.

The main body 3 includes an upwardly curving upper bar 31 with two opposite ends 311, a pair of lower bars 34 disposed below and spaced-apart from the upper bar 31, and a pair of vertical bars 32 extending downwardly and respectively from the lower bars 34. Each of the lower bars 34 has an outer end 341 connected integrally to a respective one of the opposite ends 311 of the upper bar 31, and extends from the outer end 341 in a direction toward the other one of the lower bars 34 to form an inner end 342. Each of the vertical bars 32 has an upper end portion 322 connected integrally to the inner end 342 of a respective one of the lower bars 34, and a lower end portion 323 formed with a pair of radial protrusions 321 which are opposite to each other. A pair of resilient anti-slip members 313 are inserted respectively between the outer ends 341 of the lower bars 34 and the opposite ends 311 of the upper bar 31.

Each of the connecting members 4 has a first mounting tube 41, a second mounting tube 42 with a vertical axis parallel to an axis of the first mounting tube 41, and a connecting portion 45 which is formed as an elongate plate that is disposed in an upright orientation and that extends in a horizontal direction for interconnecting outer wall surfaces of the first and second mounting tubes 41, 42. The first mounting tube 41 has an annular inner surface which defines an axial coupling hole 411 and which has an upper section formed with a plurality of axially extending teeth 412 that are arranged around the coupling hole 411. The second mounting tube 42 confines an axial hole 421 with open upper and lower ends.

Each of the coupling sleeves 43 extends into the coupling hole 411 in the first mounting tube 41 of a respective one of the connecting members 4, and has an annular outer surface which has an upper section formed with a plurality of axially extending teeth 431 that mesh with the teeth 412 on the inner surface of the first mounting tube 41 so as to prevent relative rotation between the coupling sleeve 43 and the first mounting tube 41. As shown in FIG. 4, each of the coupling sleeves 43 has an open upper end and a closed lower end so as to define a blind insert hole 432 therein for receiving the lower end portion 323 of a respective one of the vertical bars 32. Each of the coupling sleeves 43 further has an inner surface formed with a pair of diametrically opposite radial grooves 433 which extend axially from the upper end of the coupling sleeve 43 for receiving and engaging the radial protrusions 321 on the vertical bars 32 so as to prevent relative rotation between the vertical bars 32 and the coupling sleeves 43. The upper end of each of the coupling sleeves 43 is formed with a radially and outwardly extending annular flange 430 that is seated on an upper end of the first mounting tube 41 of a respective one of the connecting members 4. The relative position between each of the coupling sleeves 43 and the first mounting tube 41 is adjustable by removing the coupling sleeve 43 from the first mounting tube 41 in an upward direction along the axis of the first mounting tube 41.

Each of the packing sleeves 44 extends into the axial hole 421 in the second mounting tube 42 of a respective one of the connecting members 4, and has an upper end formed with a radially and outwardly extending annular rim 441 that is seated on the upper end of the second mounting tube 42. Each of the packing sleeves 44 confines an axial passage hole 442 adapted to permit extension of a respective one of the mounting rods 54 of the headrest member 53 therethrough. Preferably, the axial passage hole 442 has a cross-section conforming with that of the respective mounting rod 54. As the cross-sections of the mounting rods 54 might be different in different types of headrest members, the size of the packing sleeves 44 is selected so as to match that of the mounting rods 54 to which the suit hanger is applied.

A label plate 33 may be provided on the main body 3. The label plate 33 has two opposite end portions which are bent to form coupling ring portions 331, 332 with vertical axes. The coupling ring portions 331, 332 are hooked at the vertical bars 32, respectively.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A suit hanger adapted for use in an interior of a car, the interior of the car being provided with a seat member and a headrest member which has a pair of downwardly extending vertical mounting rods for mounting on top of the seat member, said suit hanger comprising:

a main body having
an upwardly curving upper bar with two opposite ends,
a pair of lower bars disposed below said upper bar, each of said lower bars having an outer end connected to a respective one of said opposite ends of said upper bar, and an inner end that extends from said outer end in a direction toward the other one of said lower bars, and
a parallel pair of vertical bars, each of which has an upper end portion connected to said inner end of a respective one of said lower bars, and a lower end portion; and a pair of connecting members, each of which has a first mounting tube that is sleeved on said lower end portion of a respective one of said vertical bars, a second mounting tube adapted to be sleeved on a respective one of the mounting rods of the headrest member, and a connecting portion interconnecting said first and second mounting tubes.

2. The suit hanger according to claim 1, wherein said first mounting tube of each of said connecting members has an open upper end for receiving said lower end portion of a respective one of said vertical bars, and is formed with an internal screw thread, said lower end portion of each of said vertical bars being formed with an external screw thread for engaging said internal screw thread of said first mounting tube.

3. The suit hanger according to claim 2, wherein said connecting portion of each of said connecting members is formed as a curved rod, and has a first end portion formed with an external screw thread, said first mounting tube of each of said connecting members further having an open lower end which permits said first end portion of said connecting portion to extend thereinto for engaging threadedly said first mounting tube.

4. The suit hanger according to claim 1, further comprising a pair of resilient anti-slip members mounted on said upper bar adjacent to said opposite ends of said upper bar.

5. The suit hanger according to claim 1, further comprising a pair of resilient anti-slip members which are provided between said upper bar and said lower bars adjacent to said outer ends of said lower bars and said opposite ends of said upper bars.

6. The suit hanger according to claim 1, wherein said upper and lower bars and said vertical bars of said main body are interconnected integrally.

7. The suit hanger according to claim 1, wherein said connecting portion of each of said connecting members is formed as an elongate plate which extends in a horizontal direction.

8. The suit hanger according to claim 7, further comprising a pair of packing sleeves, each of which is disposed in said second mounting tube of a respective one of said connecting members, and is adapted to permit extension of a respective one of the mounting rods of the headrest member therethrough.

9. The suit hanger according to claim 8, wherein said second mounting tube of each of said connecting members has an upper end, each of said packing sleeves having an upper end formed with a radially and outwardly extending annular rim that is seated on said upper end of said second mounting tube of a respective one of said connecting members.

10. The suit hanger according to claim 7, further comprising a pair of coupling sleeves, each of which is disposed in said first mounting tube of a respective one of said connecting members, and has said lower end portion of a respective one of said vertical bars extending thereinto.

11. The suit hanger according to claim 10, wherein said first mounting tube of each of said connecting members has an annular inner surface formed with axially extending teeth, each of said coupling sleeves having an outer surface formed with axially extending teeth for meshing with said teeth on said first mounting tube of a respective one of said connecting members to prevent relative rotation between said a respective one of said coupling sleeves and said first mounting tube.

12. The suit hanger according to claim 10, wherein said first mounting tube of each of said connecting members has an upper end, each of said coupling sleeves having an upper end formed with a radially and outwardly extending annular flange that is seated on said upper end of said first mounting tube of a respective one of said connecting members.

13. The suit hanger according to claim 10, wherein each of said coupling sleeves has an open upper end and a closed lower end so as to define a blind insert hole for receiving said lower end portion of a respective one of said vertical bars.

14. The suit hanger according to claim 10, wherein said lower end portion of each of said vertical bars is formed with at least one radial protrusion, each of said coupling sleeves having an inner surface formed with a radial groove for engaging said radial protrusion of a respective one of said vertical bars so as to prevent rotation of said coupling sleeves relative to said vertical bars.

* * * * *